(No Model.) 3 Sheets—Sheet 1.
J. F. McLAUGHLIN.
CLOSED CONDUIT ELECTRIC RAILWAY.

No. 527,873. Patented Oct. 23, 1894.

Witnesses:
J. B. McGinn.
F. T. Chapman.

Inventor;
James F. McLaughlin,
By Joseph Lyons,
Attorney.

(No Model.) 3 Sheets—Sheet 2.
J. F. McLAUGHLIN.
CLOSED CONDUIT ELECTRIC RAILWAY.
No. 527,873. Patented Oct. 23, 1894.
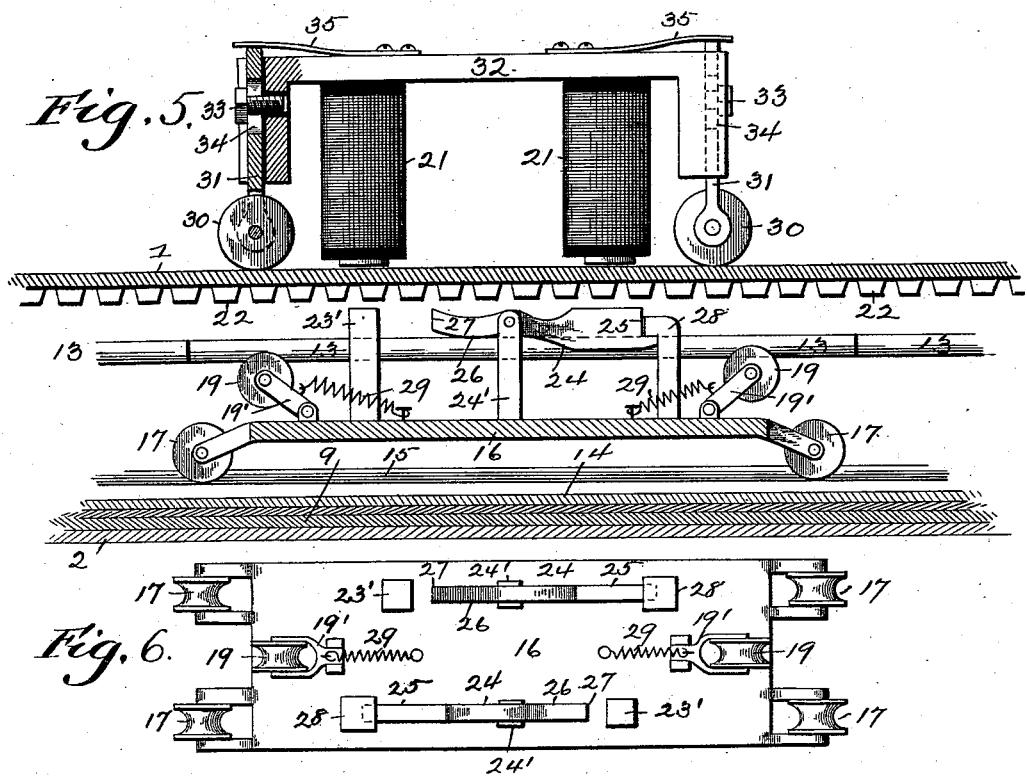
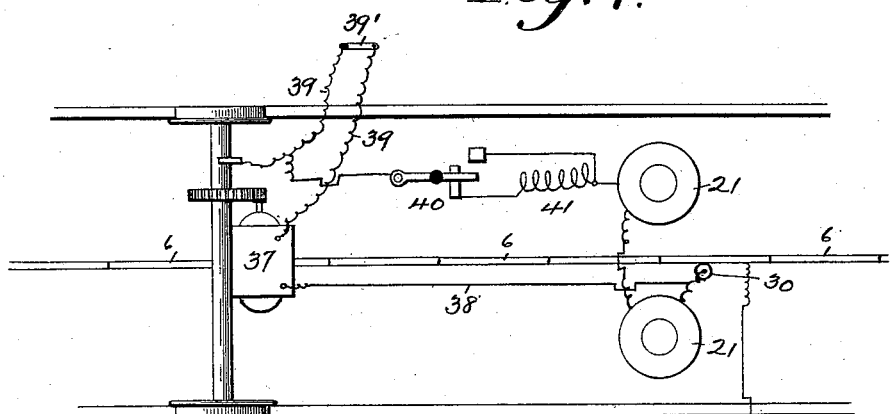
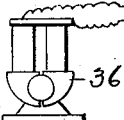
Witnesses: Inventor,
James F. McLaughlin,
By Joseph Lyons.
Attorney.

(No Model.) 3 Sheets—Sheet 3.

J. F. McLAUGHLIN.
CLOSED CONDUIT ELECTRIC RAILWAY.

No. 527,873. Patented Oct. 23, 1894.

Witnesses:
J. B. McGirr.
F. T. Chapman.

Inventor,
James F. McLaughlin,
By Joseph Lyons,
Attorney.

THE NORRIS PETERS CO., PHOTO-LITHO., WASHINGTON, D. C.

UNITED STATES PATENT OFFICE.

JAMES F. McLAUGHLIN, OF PHILADELPHIA, PENNSYLVANIA.

CLOSED-CONDUIT ELECTRIC RAILWAY.

SPECIFICATION forming part of Letters Patent No. 527,873, dated October 23, 1894.

Application filed April 5, 1894. Serial No. 506,470. (No model.)

*To all whom it may concern:*

Be it known that I, JAMES F. MCLAUGHLIN, a citizen of the United States, and a resident of Philadelphia, in the county of Philadelphia, State of Pennsylvania, have invented certain new and useful Improvements in Closed-Conduit Electric Railways, of which the following is a specification.

This invention has reference to improvements in electric railways in which there is a closed conduit containing a continuous main conductor and an exposed sectional conductor, and in which the exposed sections are successively put in electrical connection with the main conductor by a traveling contact controlled magnetically from the car.

The present invention includes certain improvements in the construction of the conduit and traveling contact, and in the means for collecting the current and magnetically controlling the traveling contact or trolley. These and other improvements are fully described in the following specification, taken in connection with the annexed drawings, in which—

Figure 1:
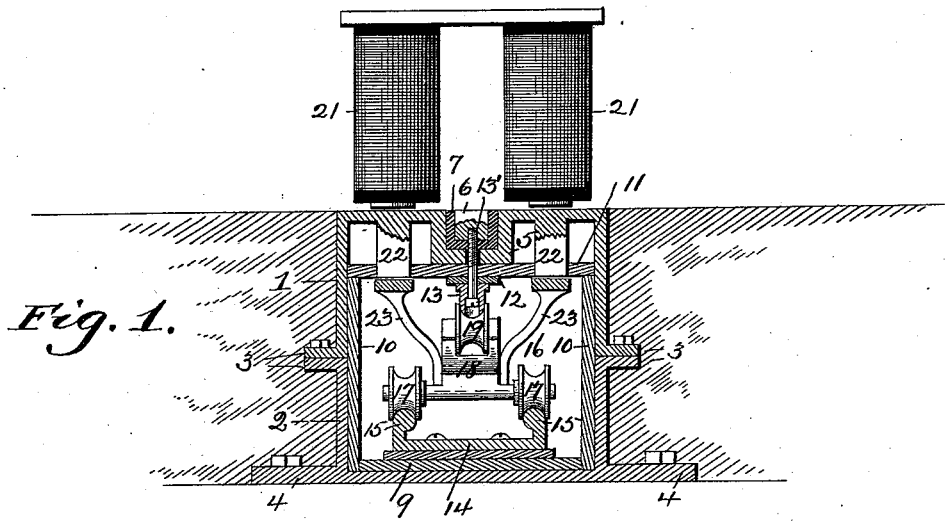
Figure 2:
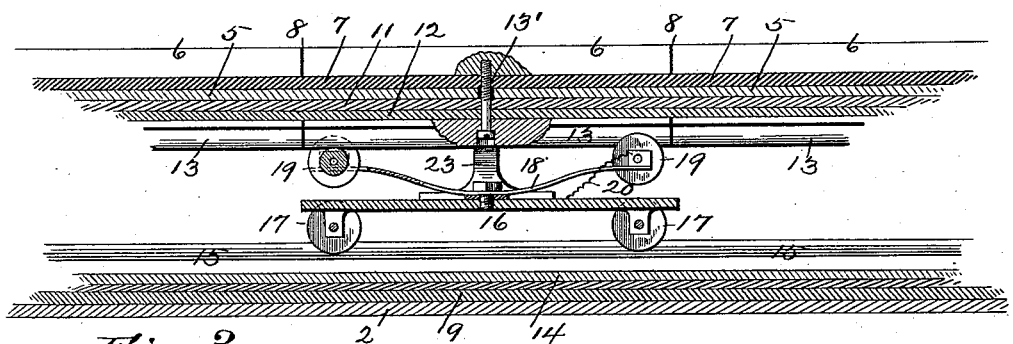
Figure 3:
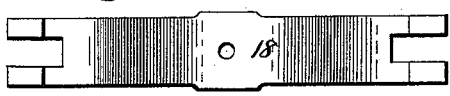
Figure 4:
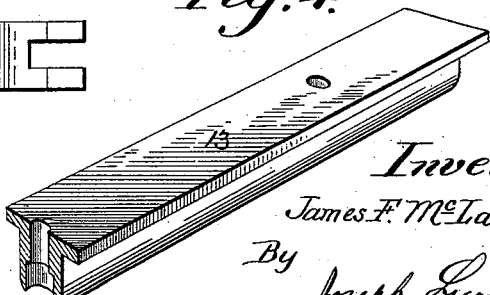
Figure 8:
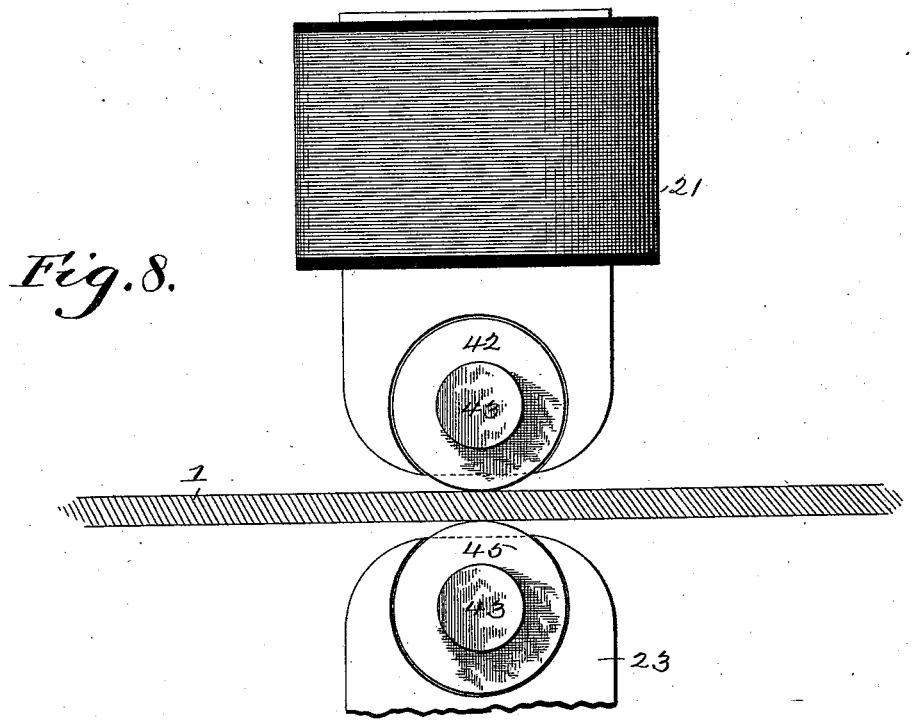
Figure 9:
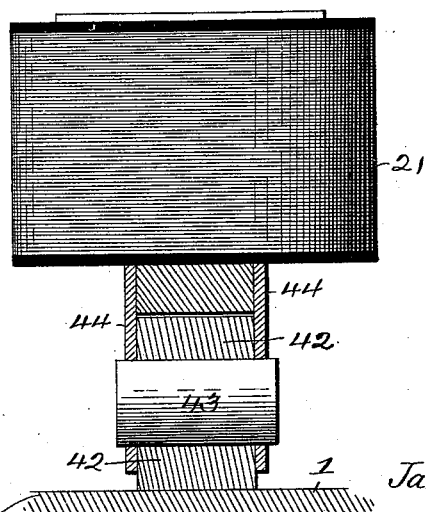

Figure 1, is a cross-section of an underground closed-conduit, constructed in accordance with my invention, with the circuit closing trolley and trolley controlling magnets shown in elevation. Fig. 2 is a longitudinal section of the same, the trolley controlling magnets being omitted. Fig. 3, is a plan view of a spring roller support used on the trolley. Fig. 4, is a perspective view of a part of the upper sectional underground conductor. Fig. 5, is a longitudinal section partly in elevation of a modified embodiment of the invention. Fig. 6 is a plan view of the trolley shown in Fig. 5. Fig. 7 is a diagram of the circuit connections, and Figs. 8 and 9, are views illustrating further modifications.

Like numerals of reference indicate like parts throughout the drawings.

The conduit consists essentially of a rectangular metal box formed of an upper section 1, and a lower section 2, each provided at the meeting edges with longitudinal flanges 3, by means of which the two parts of the box are fastened together by bolts or screws.

The lower section 2, of the conduit is provided at intervals with lugs or feet 4, for fastening it to the ties supporting the track-rails, or to ties or sleepers provided for this purpose.

The upper section 1, of the box has a central longitudinal depression groove or recess 5, in which is laid a conductor 6, separated from the walls of the groove by insulation 7, and made up of short sections insulated from each other at the ends, as indicated at 8, Fig. 2. This sectional conductor 6, is flush with or projects slightly above the top of the box, which latter has its upper face exposed and flush with the surface of the road. The bottom and sides of the lower section 2, of the box are lined with water-proof insulating material, which may be composed of suitably prepared wooden boards 9, 10, and another like board 11, is secured, in a manner to be described, against the under face of the longitudinal depression 5, in the top section of the box. These boards are so arranged that when the box sections are secured together there will be an unobstructed passage throughout the length of the conduit.

On the under side of the board 11, beneath the conductor 6, is a strip 12, of insulating material against which is secured another sectional conductor 13, having its lower edge rounded as shown and its contiguous ends insulated. Each section of the conductor 13, is secured to a like section of the conductor 6, by screws 13', the heads of which enter countersinks in the conductor 13, and their threaded ends enter nuts formed in the conductor 6. These screws also serve to clamp the board 11, against the under side of the longitudinal depression 5, in the top section of the box, and to establish electrical connection between the like sections of the conductors 6 and 13. The screws 13', are insulated from the metal box, where they pass through the same by suitable bushings, as indicated. Extending along the bottom of the interior of the box and secured to, but insulated therefrom, is a continuous rail-shaped conductor 14, having at each side an upturned flange terminating in a tread 15.

The treads of the conducting rail support a carriage constructed for travel in the conduit and constituting a trolley for establishing the circuit between the continuous conductor rail 14, and the sectional conductor 13. This carriage or trolley is shown in Figs. 1 and 2, and, in modified form in Figs. 5 and 6. It consists essentially of an iron truck 16, having four grooved contact wheels 17, two to each tread 15, and a double arm spring 18, mounted centrally on the truck and carrying at each end a grooved contact roller 19, bearing upwardly against and traveling along the sectional conductor 13. The spring arm 18, is so constructed and is of such strength that the wheels 17 and rollers 19, will bear on the conductors 13, 14 and 15, respectively, with sufficient force to insure good electrical contact, and at the same time resist a lifting action to which the trolley is subjected when in operation, due to the means employed for propelling it, which means are hereinafter described.

The spring arm 18, as well as the wheels 17 and rollers 19, may be made of some good conducting material such for instance as phosphor-bronze, but to prevent the possibility of injury to the spring arm by the passage of the current therethrough one or more flexible conductors 20, (Fig. 2) may be led from the truck frame 16, to the bearings of the rollers 19.

The conduit, when once laid, is accessible only through man-holes at comparatively long intervals apart. Consequently the trolley, in order to progressively complete the circuit from the main conductor 14 to the sectional conductors 13 and 6, must be propelled with the car without being directly coupled thereto. For this purpose one or more electro-magnets 21 energized as hereinafter explained, are placed upon the car, and are of such strength and so placed as to draw the trolley along by magnetic attraction. The magnets are mounted directly on the car truck frame (not shown) so that the magnet poles may be placed close to the top of the metal box, and their distance therefrom will remain practically constant.

Along the line of travel of the electro-magnets the top of the metal box (which in this case is made of iron) is provided with downwardly projecting lugs 22, extending through the wooden board 11, and on the trolley carriage are two iron brackets 23, one on each side, projecting upwardly until close to the lower ends of the lugs 22, which latter may properly be spoken of as polar extensions of the magnets. By this construction the iron brackets 23, which constitute an armature to the magnets are brought into very effective relation to the latter.

The conduit may be constructed without the top board 11, in which case the lugs 22, will be much shorter and the armature arms or brackets be correspondingly longer as shown in Fig. 5, or the lugs may be omitted entirely, as will be evident, and in the latter case the box may be made of non-magnetic material.

It will be understood that the trolley carriage must at all times be in the conduit immediately underneath the car under the control of the magnets 21, 21. For this purpose I have provided that the magnets will always be energized, whether the car is moving, or is at rest, as will appear farther on. Notwithstanding this provision it is possible that by accident the magnet circuit may be interrupted at a critical moment; for instance while the car is coming to a stand, by the action of the usual brakes, and when the trolley carriage, has acquired considerable speed and momentum. If this should happen the trolley carriage would run ahead of the car, and passing the section of conductor 13, occupied by the car, would deprive the latter of current. To avoid such and similar accidents is the object of the construction shown in Fig. 5. For this purpose there are two armatures and two electro-magnets, each magnet being of the horse-shoe type. Each armature consists of an iron upright 23', mounted on the carriage, and an iron gravity pawl 24, fulcrumed upon a bracket 24', erected on the carriage. Each pawl 24, is so constructed that its weighted portion 25, together with the corresponding upright 23', constitutes an armature to one of the horse-shoe magnets, while its other end 26, is shaped into a tooth 27, in the path of the lugs 22. The two pawls are so disposed that, when engaging the lugs, one pawl will prevent movement of the carriage, in one direction and the other in the other direction. The upward travel of the weighted end 25, of the pawl is limited by an arm 28 rising from the carriage and having its upper end formed into a tooth projecting into the path of another tooth on the pawl as shown in Fig. 5, so that the weighted end of the pawl will not be lifted into contact with the lugs 22, when the magnet is energized. When the magnet circuits are broken the weighted ends of the two armature pawls fall, lifting the teeth 27, into engagement with the lugs 22, thereby holding the carriage from movement until the magnets are again energized and placed over the pawls.

In the structure shown in Fig. 5, the underrunning rollers 19, are mounted in pivoted bearings 19', rising from the carriage frame and are held against the conductor 13, by helical springs 29, but it will be understood that the spring shown in Figs. 1, 2 and 3, may be used in place of the bearings 19', and springs 29. The current is collected from the sectional conductor 6, by means of rollers 30, in line with each other and located in front of and at the rear of the magnets. These collecting rollers are each mounted in bearings formed at the lower end of an upright bar 31, sliding in guides formed in the frame 32, supporting the magnets. Each bar 31, is secured to the supporting frame so as to be free to move vertically, by a screw 33, passing through a slot 34, in the bar and entering a nut formed in the frame. Each roller 30, is kept in contact with the conductor 6, by a spring 35, secured to the frame 32, and bearing upon the upper end of the bar 31. The two collecting rollers 30 with their bars 31 are connected together in multiple arc, and with the motor on the car. The bars 31, may be insulated from the frame 32, but if care be taken to properly insulate the magnets from the frame 32, the circuit connections to the motor may be made directly with the said frame.

The circuit connections of the system are diagrammatically represented in Fig. 7, where the generator 36, is shown connected directly to the sectional conductor 6, but it will be understood that the connection is made by means of the trolley which is not shown in the diagram. The collector 30, is connected to one terminal of the motor 37, by a conductor 38, and the other terminal of the motor is connected with the rails, by the car wheels and conductors 39, which include a switch 39′, or other device for controlling the motor.

The magnets 21, are in a branch of the motor circuit, which branch includes a switch 40, for including or cutting out a resistance 41.

The coils of magnets 21, are of such resistance and so constructed that only a small fraction of the current, but sufficient to fully energize the magnets, will pass through the same, and the switch 40, has its contact blocks so arranged that the magnet circuit will not be broken when the resistance is thrown into and out of circuit, and danger of dropping or losing the trolley is thereby avoided.

When a car is stopped for any considerable time the resistance 41, is thrown into the magnet circuit to economize current, and the magnets are only weakly energized, but enough to hold the trolley carriage in place, should the stop be made on a grade. When the armature-pawl-catches shown in Figs. 5 and 6, are used, the resistance may be omitted and the magnet circuit broken when the car is not moving since the pawls will hold the trolley from movement. It will be evident that instead of energizing the magnets by including them in a branch of the motor circuit, storage batteries carried by the car may be used for this purpose.

In Figs. 8 and 9, is shown a construction by which a close approach to actual magnetic contact is obtained between the magnets and the armature upon the trolley carriage. The poles of the magnets are extended and each contains a roller 42, mounted upon or fixed to an axle 43, journaled or fixed in side plates 44 preferably of non-magnetic material, and applied to each side of the pole piece to confine the roller in place. The roller can be set very close to but out of actual contact with the pole piece, and projects a short distance below the latter so as to travel upon and in contact with the top of the upper section 1, of the iron conduit box.

The brackets 23, on the trolley carriage each carry a roller 45, in all respects like the rollers 42, that is to say the bracket partially embraces the roller and is provided with side plates, and the roller is mounted on an axle 43, journaled in or fixed to the side plates. The rollers 45, run in contact with the inside of the top section 1, of the conduit box, (the lugs 22, being omitted) and directly beneath the rollers 42, so that the magnetic circuit between the rollers is directly closed through the iron box section.

In constructing the conduit, the metal boxes are made in lengths convenient for handling and the lower sections, each with a corresponding length of the main conductor, are placed in a trench in the ground and are connected together, with the contiguous ends of the lengths of the main conductor coupled so as to form an unbroken track for the trolley and an unbroken conductor for the supply current. The upper sections of the box with the sectional conductors 6, and 13, are assembled and then secured to the lower box sections already placed in the ground, thus completing the conduit, care being taken that the joining surfaces are first covered with water-proof cement.

I claim and desire to secure by Letters Patent—

1. An electric railway having a closed conduit provided with a central exposed conductor, and an interior main or supply conductor, a traveling electro-magnet straddling the exposed conductor, and a trolley in the conduit for establishing the circuit between the main and exposed conductors, and carrying an armature in operative relation to the magnet, substantially as described.

2. In an electric railway the combination with a closed conduit provided with a central exposed conductor and an interior main or supply conductor, of a traveling electro magnet straddling the exposed conductor, traveling collectors in contact with the exposed conductor, and a trolley in the conduit for establishing the circuit between the main and exposed conductors and provided with an armature in operative relation to the magnet, substantially as described.

3. An electric railway having a closed conduit, a traveling electro-magnet above the conduit, a circuit closing trolley in the conduit carrying an armature for the magnet, and lugs or projections in the conduit between the magnet and armature and constituting stationary polar extensions of the magnet, substantially as described.

4. In an electric railway, the combination with a closed conduit provided with an interior main conductor, an exterior exposed conductor, and interior lugs projecting downwardly from the top of the conduit, of traveling magnets above the conduit, and a trolley in the conduit for establishing the circuit between the main and exposed conductors, and provided with pivoted armatures for the magnets constituting catches engaging the lugs when the magnet circuit is broken, substantially as described.

In testimony whereof I have signed my name to this specification in the presence of two subscribing witnesses.

JAMES F. McLAUGHLIN.

Witnesses:
MICHAEL G. PLUNKETT,
THEO. CANFIELD, Jr.